May 28, 1968      R. D. RANDALL      3,385,310

DIGITAL POSITIONER

Filed March 16, 1966      2 Sheets-Sheet 1

ROSS D. RANDALL
INVENTOR.

BY Daniel H. Bobis
Atty

May 28, 1968  R. D. RANDALL  3,385,310
DIGITAL POSITIONER
Filed March 16, 1966  2 Sheets-Sheet 2

ROSS D. RANDALL
INVENTOR.

BY Daniel H. Bobis
ATTY

United States Patent Office

3,385,310
Patented May 28, 1968

3,385,310
DIGITAL POSITIONER
Ross D. Randall, Sherborn, Mass., assignor to Worthington Corporation, Harrison, N.J., a corporation of Delaware
Filed Mar. 16, 1966, Ser. No. 534,860
2 Claims. (Cl. 137—85)

ABSTRACT OF THE DISCLOSURE

A digital positioning apparatus providing an electro-pneumatic transducer in a closed-loop control system in which the transducer is responsive to electric pulse inputs. The apparatus operates by receiving inputs through a pulse input motor and translating these inputs into incremental mechanical motion, which motion is used to move a flapper which coacts with a pneumatic nozzle, whereby back pressure is produced in a pneumatic system and is used to effect a controlled change in the pneumatically controlled device. The controlled change is fed back to the pneumatic nozzle by a mechanical linkage to effect either a linear or a variable ratio change in the nozzle position.

---

The device relates generally to a controller for use with motor controlled valves in pressure fluid handling systems, and more particularly, to an electro-pneumatic controller which converts electronic pulse inputs into a pneumatic output signal to adjust the position of the valve stem of a fluid handling valve which controller is self-adjusting with each change in position of the valve stem.

A by-product of modern fluid process control has been the development of electro-pneumatic transducers, i.e. devices which convert electric input signals from remote sensing devices into pneumatic output signals to actuate other pneumatic devices. These transducers are often used in closed-loop control systems, i.e. systems where the control is actuated by a quantity that is affected by the result of the control operation. These systems are characterized by what is known as "feedback" or "follow-up" mechanisms to provide greater sensitivity to changes for the process or apparatus being controlled, and therefore, greater accuracy.

For certain fluid processes it is desirable to affect accurate, direct digital control of pneumatically actuated devices.

The present invention meets this problem by providing an electro-pneumatic transducer in a closed-loop control system in which the transducer is responsive to electric pulse inputs. It operates by receiving inputs through a pulse input motor and translating these inputs into incremental mechanical motion, which motion is used to move a flapper which coacts with a pneumatic nozzle, whereby back pressure is produced in a pneumatic system and is used to effect a controlled change in the pneumatically controlled device. The controlled change is fed back to the pneumatic nozzle by a mechanical linkage to effect either a linear or a variable ratio change in the nozzle position.

Accordingly, it is an object of this invention to provide an electro-pneuematic transducer which is responsive to pulse inputs and can be used for digital control.

It is another object of this invention to provide an accurate electro-pneumatic controller responsive to its own output.

It is a further object of this invention to provide a simple mechanism for translating pulse inputs into pneumatic outputs.

It is still another object of this invention to provide a digital positioner for a valve in a fluid handling system, which positioner is responsive to electric pulse inputs and follows the changes in valve position.

These and other objects and advantages of the invention will become evident from the following description with reference to the accompanying drawings in which.

Figure 1:
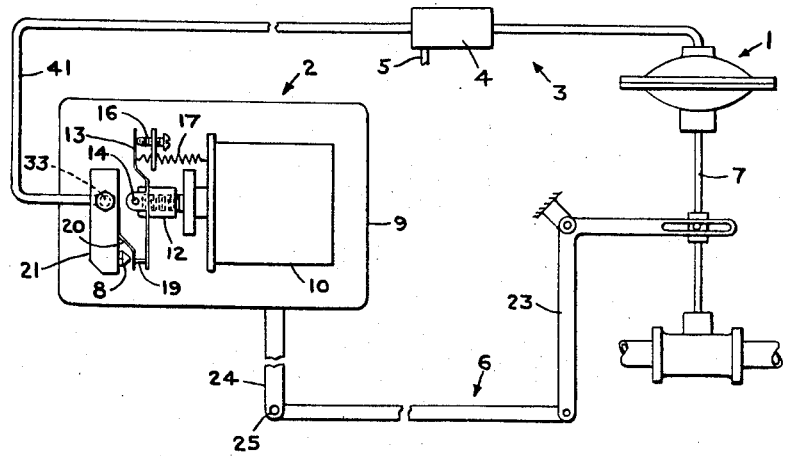
FIGURE 1 is a schematic illustration of a pneumatic valve control system as an embodiment of this invention.

Referring to the drawings, FIGURE 1 shows a pneumatically operated valve 1 with its attendant control system 3. The basic elements of this system are the electro-pneumatic transducer 2, including a pneumatic relay 4 and air supply 5, and the feedback linkage 6 from the valve stem 7 to the pneumatic nozzle 8 in the transducer.

Figure 2:
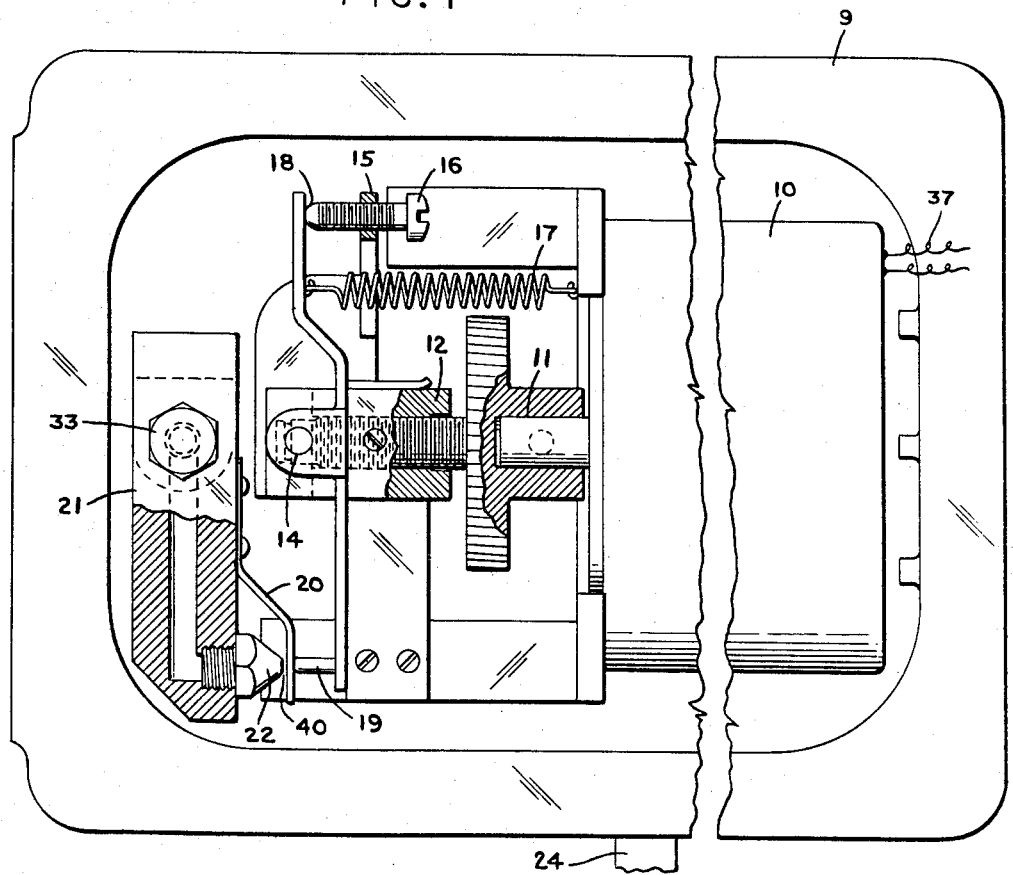
FIGURE 2 is a plan view of an electro-pneumatic transducer for pulse input response without the relay as shown in FIGURE 1.

FIGURE 2 shows a substantially hollow rectangular casing 9 having mounted therein a pulse input or stepping motor 10 which will respond to appropriate pulse inputs with an incremental rotational response of the motor shaft 11. The shaft 11 is threaded and carries a nut 12. The nut is prevented from rotating with the shaft by an anti-rotation guide 43 as more fully shown in FIGURE 4. Thus if the shaft were to rotate in a counter clockwise direction the nut would advance from right to left in FIGURE 2.

Figure 3:
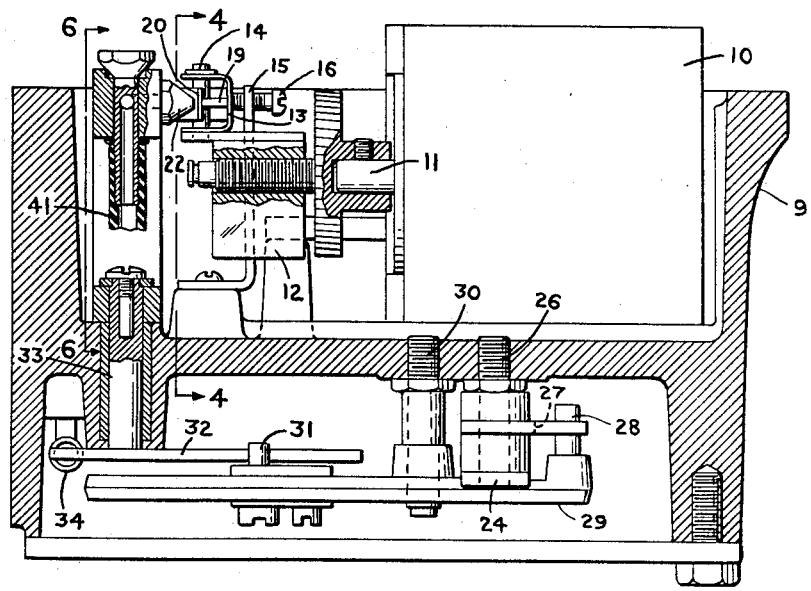
FIGURE 3 is an elevation of the transducer shown in FIGURE 2 with the casing cut away.

The nut 12 carries a cross arm 13 which is free to rotate about the mounting pin 14. A support 15 which is fixedly connected to the rectangular casing 9 carries an adjusting screw 16 which is used for initial adjustment purposes (FIGURES 2 and 3). The screw bears against one end of the cross arm. A spring 17, which is attached at one end to the casing 9, is attached at the other end to the cross arm between the mounting pin 14 and the adjusting screw 16, and maintains the contact between the cross arm and the adjusting screw, thereby keeping mechanical slack out of the assembly. The adjusting screw has a rounded end 18 in contact with the cross arm, so that on advancement of the nut, the cross arm being rotatable about the pin, will have a virtual pivot at its contact point with the rounded end 18 of the initial adjustment screw 16.

The cross arm carries a small pin 19 fixedly connected to the end remote from the adjusting screw. This pin is disposed to make contact with the flapper 20 on the nozzle mounting bracket 21 and move the flapper closer to the nozzle 22 upon advancement of the nut 12 on the motor shaft 11. The flapper 20 is made of a spring material so as to easily flex. While the nozzle mounting bracket 21 is moveable, as more fully described below, it will not move in response to the force exerted by the pin 19 of the cross arm on the flapper 20. The movement of the nozzle mounting bracket 21 is controlled by the feedback linkage 6.

Figures 4, 6:
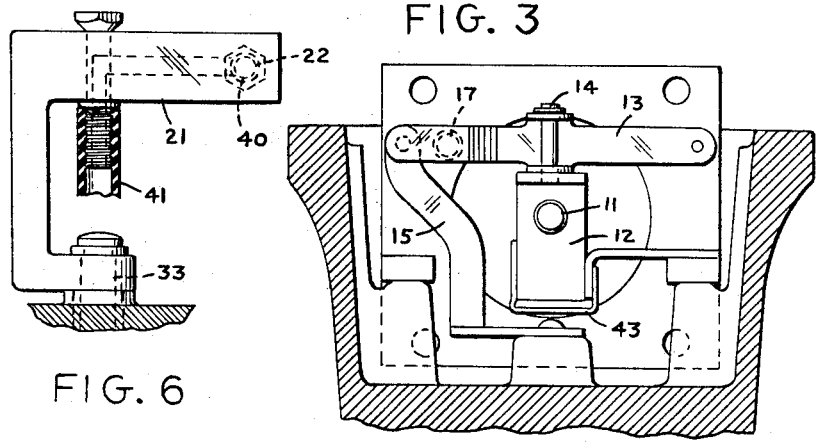
FIGURE 4 is an end view of the transducer taken along the line 4—4 shown in FIGURE 3.
FIGURE 6 is a detail taken along the line 6—6 of FIGURE 3.

The nozzle 22 has an orifice 40 therein which is in fluid communication with the relay 4 through the conduits 41 (FIGURES 1 and 6).

Feedback linkage

Figure 5:
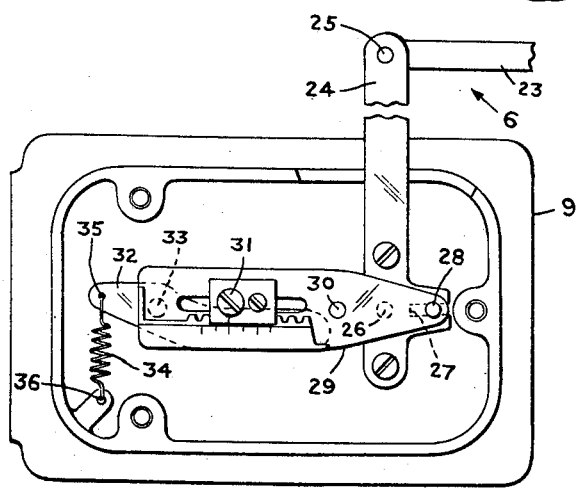
FIGURE 5 is a detail of the linkage between the transducer and the valve stem shown in FIGURE 1.

FIGURE 5 shows the feedback linkage 6 connected to the nozzle mounting bracket 21 in more detail. A standard motion transmitting linkage 23 is connected between the valve stem 7 and the input lever 24. The input lever 24 and the linkage 23 are pinned together, as at pin 25, so that they can be rotated with respect to one another. The input lever 24 is mounted on the outside of the casing 9 at a pivot joint 26. Extending from the input lever 24 is a yoke 27 which has a slot which engages a pin 28 which pin is fixedly mounted on connecting link 29. The connecting link 29 is itself pivoted about a joint 30. An adjustable sliding pin 31 on connecting link 29 is in contact with lever 32. Lever 32 is itself fixedly mounted on shaft 33 which goes through the casing 9 and is connected to the nozzle mounting bracket 21 (see FIGURES 1 and 2). The lever 32 is held in contact with the adjustable pin 31 in the connecting link 29 by a spring 34 which is connected to its end at 35 and is connected to the outside of the casing 9 at 36. While the lever 32 is fixedly connected to the shaft 33, the shaft is free to rotate within the casing 9. The nozzle mounting bracket 21 is also fixedly connected to the shaft 33. The spring 34 and the pin 31 prevent the shaft 33 from being rotated by any force exerted on the flapper 20 of the nozzle mounting bracket 21 by the pin 19 on the cross arm.

*Operation*

In operation the stepping motor 10 receives a pulse input through leads 37 from a sensing device (not shown) somewhere in the fluid system being controlled, and makes an appropriate rotational response. For example, the shaft 11 of the motor may rotate clockwise or counter clockwise a few degrees or fractions thereof. This shaft rotation is communicated by means of the thread on the shaft which is in engagement with the thread on the nut 12. For example, if the rotational response was 1.8° per pulse input and the pitch of the shaft threads was 40 threads per inch, then a thousand steps or pulse inputs of the motor would result in five revolutions of the motor shaft 11 and an advance of ⅛ of an inch of the nut 12. As the nut advances from right to left in FIGURE 2 the cross arm 14 carried by the nut also advances. However, one end of the cross arm is held against the stop screw 16 by means of the anti-backlash spring 17. The cross arm will therefore rotate about the pin 14. The pin 19 at the other end of the cross arm will have its virtual rotation pivot point at the end of the stop screw 18. Thus if the nut were to advance ⅛ of an inch, the pin 19 at the end of the cross arm would advance ¼ of an inch. As the pin 19 advances it presses against the spring like flapper 20, depressing the flapper toward the nozzle 22. As the flapper approaches the nozzle, it restricts the flow of pressure air therefrom, thereby producing nozzle back pressure. This back pressure acts through the relay 4 in the pneumatic pressure system 3 to actuate the diaphragm valve 1 and adjust the position of the valve stem 7.

The change in position of the valve stem 7 will be transmitted through the feedback linkage 6. The standard linkage 23 will transmit the motion of the valve stem 7 to the pin 25 on the input lever 24 causing the input lever to rotate about the pin 26. The rotary motion of the input lever 24 is communicated by the yoke 27 and the pin 28 to the connecting link 29 whose annular motion is thus much reduced. The sliding pin 31 on the connecting link 29 is in contact with the lever 32 as previously described, and will cause the lever 32 to rotate, which will have the effect of rotating the shaft 33. This will cause the nozzle mounting bracket 21 to rotate, and the nozzle 22 will recede from the flapper 20 until the original relation between the two is re-established. Thus in operation, the action of this closed-loop control system is such as to make the nozzle take a constant position with respect to the cross arm on the nut.

In the example previously described the total travel of the pin on the cross arm was ¼ of an inch for a ⅛ inch advancement of the nut. Thus the travel of the nozzle will likewise be ¼ of an inch. The actual travel of the valve stem, however, will be quite a bit larger depending on the size of the valve. The reduction of the actual valve stroke travel to the ¼ inch nozzle requirement is done by the feedback linkage 6. The standard motion transmitting linkage 23 can be either a linear or a variable ratio mechanism as well known in the prior art.

The device described above provides a "follow-up" mechanism resulting in the valve stem travel following the incremental travel of the nut of the motor output shaft.

The entire travel of the valve may be divided, for purposes of example, into one-thousand steps so that the accuracy is then 0.1 percent in the example previously given.

Since the mechanism in the transducer does not use calibrated springs, nor does it translate any forces into air pressure, there results a simpler rechanism with less problems in the area of linearity and sensitivity changes as a result of altered pressure levels.

It will be understood that the invention is not to be limited to the specific construction and arrangement of parts shown, but they may be widely modified within the scope of the invention defined by the claims.

What is claimed is:

1. An actuator for the flapper-nozzle assembly of an electro-pneumatic transducer comprising:
   a casing;
   a motor mounted in said casing responsive to electrical pulse inputs;
   said motor having a threaded shaft for rotation in response to said electric pulse inputs;
   a pneumatic nozzle having an orifice therein mounted on said casing;
   means for delivering fluid under pressure connected to said nozzle and coacting therewith to issue fluid from said orifice;
   a flapper mounted on said casing and disposed in front of said orifice and spaced therefrom for restricting the flow of fluid therefrom;
   linkage means connected to said shaft and in operative engagement with said flapper for translating and transmitting the rotation of said shaft to said flapper comprising:
      said shaft carrying a threaded nut in engagement therewith;
      said nut having a cross arm pivotally attached thereto at the center of said cross arm;
      an anti-rotation guide fixedly connected to said casing and embracing said nut to prevent rotation of said nut upon rotation of said shaft;
      a spring connected at one end to said cross arm and at the other end at said casing;
      rigid adjusting means fixedly mounted in said casing and contacting said cross arm to adjust the initial position of said cross arm with respect to said nut;
      said spring maintaining said cross arm in contact with said adjusting means, said cross arm having its other end in contact with said flapper.

2. A device as in claim 1 wherein feedback means mounted on said casing and connected to said nozzle to change the position of said nozzle with respect to said flapper.

References Cited

UNITED STATES PATENTS

| 3,080,853 | 3/1963 | Puster | 137—85 |
| 3,080,878 | 3/1963 | Dustin | 137—85 |
| 3,222,996 | 12/1965 | Thieme | 137—596.17 X |
| 3,315,250 | 4/1967 | Higgins | 137—85 X |

ALAN COHAN, *Primary Examiner.*